(12) United States Patent
Arnold et al.

(10) Patent No.: US 7,455,234 B2
(45) Date of Patent: Nov. 25, 2008

(54) ROLL BACK METHOD FOR A SMART CARD

(75) Inventors: Siegfried Arnold, Graz (AT); Christian Lackner, Graz (AT)

(73) Assignee: NXP B.V., Eindhoven (NL)

( * ) Notice: Subject to any disclaimer, the term of this patent is extended or adjusted under 35 U.S.C. 154(b) by 166 days.

(21) Appl. No.: 10/516,468

(22) PCT Filed: May 16, 2003

(86) PCT No.: PCT/IB03/01962

§ 371 (c)(1),
(2), (4) Date: Jul. 21, 2006

(87) PCT Pub. No.: WO03/102956

PCT Pub. Date: Dec. 11, 2003

(65) Prior Publication Data

US 2007/0194116 A1 Aug. 23, 2007

(30) Foreign Application Priority Data

Jun. 4, 2002 (EP) .................................. 02100664

(51) Int. Cl.
*G06K 19/06* (2006.01)

(52) U.S. Cl. ...................................... 235/492; 235/487

(58) Field of Classification Search .................. 235/492, 235/487, 486, 383, 384; 707/200, 202; 714/4, 714/15, 10, 26
See application file for complete search history.

(56) References Cited

U.S. PATENT DOCUMENTS

| | | | | |
|---|---|---|---|---|
| 5,835,698 | A * | 11/1998 | Harris et al. | 714/15 |
| 6,272,607 | B1 * | 8/2001 | Baentsch et al. | 711/162 |
| 6,671,820 | B1 * | 12/2003 | Kelman | 714/4 |
| 6,678,704 | B1 * | 1/2004 | Bridge et al. | 707/202 |
| 6,760,862 | B1 * | 7/2004 | Schreiber et al. | 714/15 |
| 2001/0007108 | A1 * | 7/2001 | Teich et al. | 707/200 |
| 2002/0047920 | A1 * | 4/2002 | Richter | 348/460 |

OTHER PUBLICATIONS

Rankl et al: "Smart Card Handbook, Passage" Smart Card Handbook, XX, XX, 1998, pp. 1,14,91,103,107-110,127-128.

* cited by examiner

*Primary Examiner*—Thien M Le

(57) ABSTRACT

In a data carrier (2) for contactless communication of storage data (SD) with a reader station (1), a recovery device (13) is provided, with which, following an unexpected abort of the storing of storage data (SD) in a memory (11) by virtue of a lack of supply voltage, a valid storage state can be restored in memory (11). For this purpose, any storage locations that are only weakly stored in memory (11) will be read, and the read-out storage data (SD) will be re-stored in the memory (11).

9 Claims, 2 Drawing Sheets

ROLL BACK METHOD FOR A SMART CARD

The invention relates to a recovery device for recovering valid storage data in a memory, with:
storage means for storing the storage data in storage areas of the memory;
readout means for reading the stored storage data from the storage areas of the memory; and
recovery means for detecting an unexpected abort during the storing of storage data and for recovering valid storage data in the memory.

The invention further relates to a recovery method for recovering valid storage
data in a memory, wherein the following steps are followed:
storing of storage data in storage areas of the memory;
reading of the stored storage data from the storage areas of the memory;
detection of an unexpected abort during the storing of storage data;
recovery of valid storage data in the memory if an abort has been detected.

The invention further relates to a data carrier for contactless communication with a reader station, with a memory for storing storage data and with communication means for receiving storage data to be stored in the memory and for transmitting storage data read from the memory.

A recovery means of this type, a recovery method of this type and a data carrier of this type are known from document U.S. Pat. No. 6,272,607. The known data carrier is formed by a smart card, which comprises a recovery device for storing storage data in a memory. The smart card comprises communications means, with which the smart card is designed for contactless communication with a reader station. To this end, the reader station generates a high-frequency, electromagnetic field, which is modulated for the transmission of storage data, and from which the smart card obtains the power supply for supplying the smart card.

The memory of the smart card is formed by an EEPROM. By means of a read command, the reader station can read certain storage areas of the EEPROM, for which purpose readout means provided in the smart card read storage data stored in the certain storage areas, and transmit it to the reader station by means of the communication means. Further, by means of a write command, the reader station can store certain storage data in certain storage areas of the EEPROM, for which purpose storage means provided in the smart card store the storage data received from the reader station by means of the communication means, in the storage areas of the EEPROM specified by the reader station.

One storage location of the EEPROM is formed by a MOS transistor with a floating gate, wherein, to set the storage location, charges are transferred into the floating gate by means of the tunnel effect. In order to erase the storage location, charges are discharged from the floating gate of the MOS transistor by means of the tunnel effect. Before a bit with a digital value of "1" is stored, or before the storage location is set, the floating gate is erased from the storage means in order to be subsequently charged to a voltage value representing the digital value "1". When reading this storage location, the readout means check the voltage value stored in the floating gate, and compare it with a threshold value in order to decide whether the digital value "0" or the digital value "1" is stored in the storage location.

The known smart card is equipped with recovery means which, in the event that the storage procedure is unexpectedly aborted during the storage of the storage data in storage areas of the EEPROM, recovers the storage data that was previously stored in the storage areas, if this is necessary, in accordance with a recovery method. An unexpected abort of the storage procedure always occurs when the smart card is removed from the electromagnetic field during a storage procedure, and therefore the power supply of the smart card suddenly fails.

In accordance with the known recovery method, before the storage of the first storage data in a data storage area of the memory, the second storage data stored in the data storage area is stored in a backup storage area of the memory and then a second validity information is stored in a validity storage area of the memory. Subsequently, the data storage area is erased, then the first storage data is stored in the data storage area and then a first validity information is stored in the validity storage area. The first validity information identifies the data storage area, and a second validity information identifies the backup storage area as a storage area comprising valid storage data.

If the storage procedure is now interrupted, in accordance with the known recovery method, the validity storage area is first read and a check is made as to whether the first or the second validity information has been read. If the second validity information has been read, the second storage data stored in the backup storage area will be newly stored in the data storage area, and therefore the valid storage status that existed before the aborted storage procedure is restored.

It has transpired that, if the storage procedure is aborted at precisely the instant at which the validity information is stored in the validity storage area, it may happen that the validity information is stored only weakly in the validity storage area. Designated a weakly stored storage location is a storage location with a charge stored in the insulated gate that does not correspond with the charge provided for a bit "1" or for a bit "0", since the charging procedure or discharging procedure has been interrupted by the sudden abort. If the readout means reads a weakly stored storage location, it may happen that the analog voltage value read lies only just below a threshold voltage, and a bit "0" is read, or lies just above this threshold voltage, and therefore a bit "1" is read. Different results regarding the stored validity information may therefore be obtained hereby in the case of multiple reading.

In the known device, it may happen that, if the second validity information has been stored only weakly by virtue of an unexpected abort, the recovery method may, following the reading of the second validity information, again be aborted during the storage of the second storage data in the data storage area. In this case, it has proved a disadvantage that, on renewed reading of the validity storage area, the first validity information can be read and therefore invalid storage data is stored in the data storage area. This invalid storage data comprises some first and some second storage data, which is very disadvantageous.

It is an object of the invention to create a recovery device in accordance with the generic type specified in the first paragraph, a recovery method in accordance with the generic type specified in the second paragraph and a data carrier in accordance with the generic type specified in the third paragraph, in all of which the disadvantages specified above are avoided. In order to achieve the above-mentioned object, the recovery means for recovering valid storage data in a recovery device of this kind are designed to re-store the read-out storage data in the same storage area in the memory following the reading of storage data from at least one storage area of the memory.

In order to achieve the above-mentioned object, in a recovery method of this kind, the recovery of the valid storage data is improved to the effect that, following the reading of storage data from at least one storage area of the memory, the read-out storage data is re-stored in the same storage area in the memory.

In order to achieve the above-mentioned object, in a data carrier of this kind, a recovery device as claimed in any one of claims 1 to 5 is provided.

As a result of the features in accordance with the invention, it is achieved that, as a result of an unexpected abort during the storing of storage data, any storage data that is only weakly stored will be read, and the read-out storage data will be stored in the memory. As a result, it is advantageously prevented that, if storage data of this kind is read on multiple occasions, different storage data will be read, which could have serious consequences. For example, weakly stored storage data could identify the user of a storage device as authorized to enter a protected area on one occasion, and unauthorized on another.

Even if incorrect storage data were ultimately to be stored in the memory by the recovery device following an unexpected abort during storage, this could, if applicable, be established by a simple test procedure. It is, however, advantageously prevented that weakly stored storage data, which could, where applicable, be judged to be correct during a test procedure of this kind, but which could prove to be incorrect in further read-out procedures, is stored in the memory.

In addition, the advantage is obtained that the storage data read by the recovery means is re-stored in the same storage areas, and therefore weakly stored storage data is reliably over stored. Furthermore, a significantly more efficient utilization of the memory is obtained.

In accordance with the measures claimed in claim 2 or claim 7, the advantage is obtained that, following the reading of the validity storage area, the recovery means re-stores the read-out first or second validity information in the validity storage area, whereby it is ensured that the validity information is reliably, not weakly, stored. It is thereby prevented that, following an abort of the recovery method, the readout means reads validity information that differs from that read during the previous execution of the recovery method. It is thereby advantageously ensured that, even in the event of multiple aborts of storage procedures, and even multiple aborts of the recovery method, valid data is always stored in the data storage area.

In accordance with the measures claimed in claim 3 or claim 8, the advantage is obtained that, even if it is precisely during the storage of the validity information that an unexpected abort occurs, it is ensured that, following the execution of the recovery method, valid storage data is stored in the data storage area.

In accordance with the measures claimed in claim 4 or claim 9, it is achieved that the first validity information and the second validity information are formed by complementary bit combinations. This gives rise to the greatest possible redundancy.

In accordance with the measures claimed in claim 5 or claim 10, the advantage is obtained that the second validity information can only be amplified and in no event erased. This measure gives rise to 100% data security, since an unexpected abort of the storing of storage data at an arbitrary time cannot lead to any data loss.

The invention will be further described with reference to examples of embodiments shown in the drawings, to which, however, the invention is not restricted.

Figure 1:
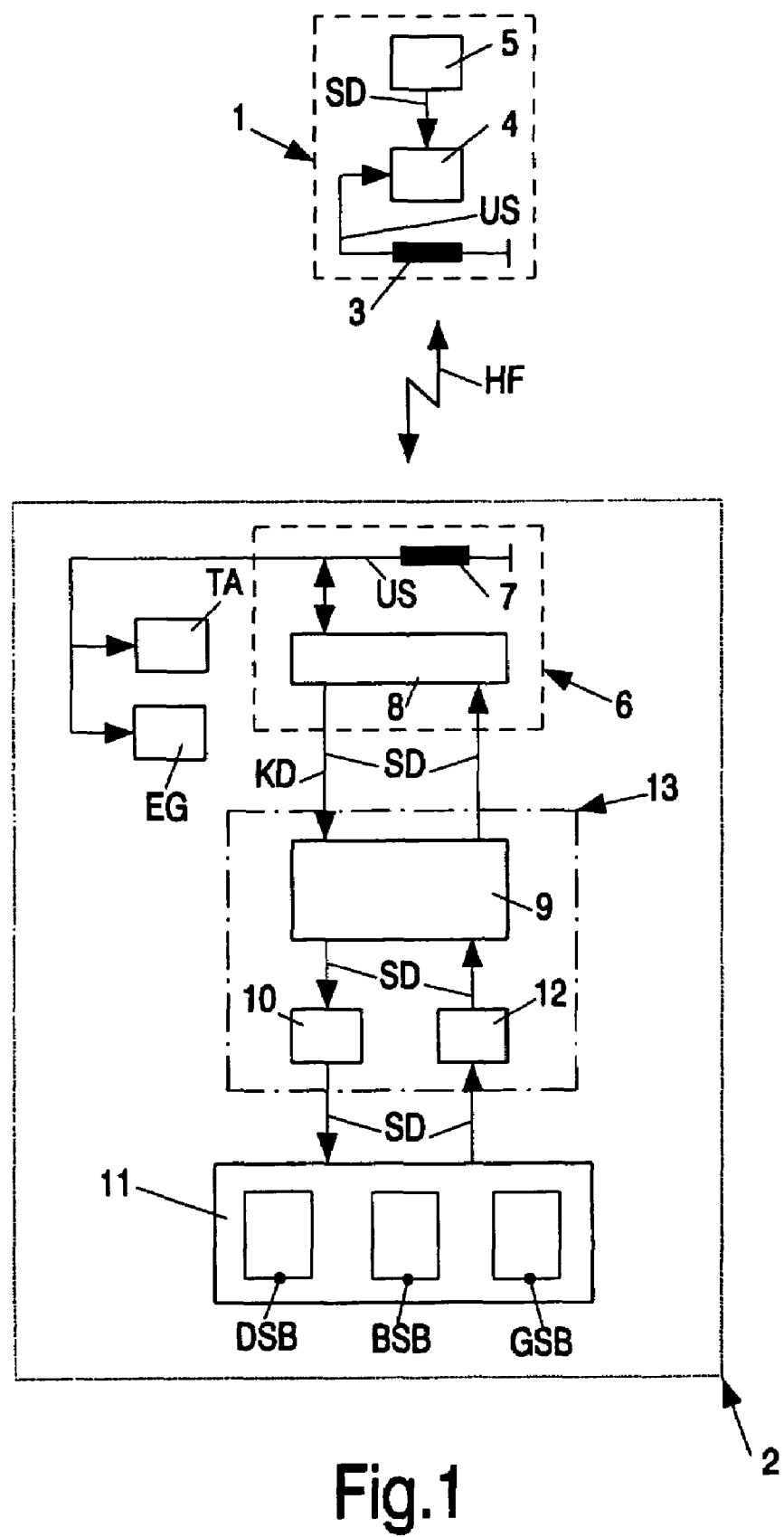
FIG. 1 shows a block circuit diagram of a reader station and a data carrier, which are designed for contactless communication via an electromagnetic field.

FIG. 1 shows a reader station 1, which generates an electromagnetic field HF and which is designed for contactless communication of a transmission signal US with a data carrier 2 via the electromagnetic field HF. Reader station 1 comprises an antenna 3, processing means 4 and storage means 5. The processing means 4 comprises modulation means for amplitude modulation of command data KF and storage data SD, which are contained in the transmission signal US and to be transmitted to data carrier 2. Processing means 4 further comprises demodulation means for demodulating the transmission signal US, load-modulated by data carrier 2, in which storage data SD is transmitted from data carrier 2 to reader station 1. A reader station 1 of this kind has been known for a considerable time, for which reason it will not be described in greater detail here.

Data carrier 2 forms a recovery device and comprises communication means 6 with an antenna 7 and a transmission/reception stage 8. With antenna 7, the transmission signal US can be received and transmitted to the transmission/reception stage 8. Transmission/reception stage 8 is designed to demodulate the amplitude-modulated transmission signal US and to send the command data KD and storage data SD contained in transmission signal US to the processing means 9 of data carrier 2. Transmission/reception stage 8 is further designed to load-modulate transmission signal US with the storage data SD sent from processing means 9 to transmission/reception stage 8.

Also connected to antenna 7 is a clock-pulse generation stage TA, which generates a system clock for the transmission/reception stage 8 and the processing means 9 of data carrier 2 from transmission signal US, which has a clock frequency of 13.56 MHz. Also connected to antenna 7 is a supply stage EG, which rectifies transmission signal US, and which provides the power supply for operating the passive data carrier 2. The elements of data carrier 2 are operated exclusively with the power supply provided by supply stage EG. Data carrier 2 can therefore be operated only in the vicinity of reader station 1 or other comparable reader stations.

The processing means 9 of data carrier 2 is formed by a microcomputer, and executes a software program in order that data carrier 2 can be used as an electronic subway ticket. The storage data SD received from reader station 1 hereby contains credit values corresponding to a monetary value, which are credited by reader station 1 to the balance stored in data carrier 2. Storage data SD may likewise contain fare values corresponding to the fare for a subway journey, which are debited by reader station 1 from the balance stored in data carrier 2.

In order to store storage data SD, data carrier 2 comprises storage means 10, which is designed for storing storage data SD in a memory 11. The storage means 10 hereby manages storage areas of memory 11, wherein a data storage area DSB, a backup storage area BSB and a validity storage area GSB are defined. For reading storage data SD stored in storage areas of memory 11, data carrier 2 comprises readout means 12, which sends the read-out storage data SD to processing means 9.

Memory 11 is formed by an EEPROM (Electric Erasable Programmable Read Only Memory), wherein each storage area of the EEPROM is formed by a multiplicity of storage locations. Each storage location of the EEPROM is formed by a MOS transistor with a floating gate, wherein, in order to set the storage location, charges are transferred into the floating gate by means of the tunnel effect. To erase the storage location, charges are discharged from the floating gate of the MOS transistor by means of the tunnel effect. Before a bit with a digital value of "1" is stored, or before the storage location is set, the floating gate is erased from storage means 10 in order to be subsequently charged to a voltage value representing the digital value of "1". In reading this storage location, the readout means 12 checks the voltage value stored in the floating gate and compares this with a threshold value US in order to decide whether the digital value of "0" or the digital value of "1" is stored in the storage location.

If data carrier 2 is removed from electromagnetic field HF, supply stage EG can no longer provide a power supply, and the processing of transmission/reception means 8, processing means 9 and storage means 10 and readout means 12 can suddenly be aborted. If this abort relates to a storage procedure for storing storage data SD in memory 11, storage data SD which is to be stored or already stored could be lost as a result. In order to prevent this, processing means 9, storage means 10 and readout means 12 form reprocessing means 13, which is designed for establishing the unexpected abort during storing of storage data SD and for recovering valid storage data SD in data storage area DSB of memory 11.

It has transpired that, owing to an unexpected abort of the storing of storage data SD, one or more storage locations could be weakly stored. Designated a weakly stored storage location is a storage location with a charge stored in the insulated gate that does not correspond with the charge provided for a bit "1" or for a bit "0", since the charging procedure or discharging procedure has been interrupted by the sudden abort. If the readout means 12 reads a weakly stored storage location, it may happen that the analog voltage value read lies only just below a threshold voltage US and a bit "0" is read, or lies just above this threshold voltage US, and therefore a bit "1" is read. Different results regarding the storage data SD stored in weakly stored storage locations may therefore be obtained hereby in the case of multiple readouts, which would be very disadvantageous.

The recovery means 13 is designed, in particular, to restore the read-out storage data SD in the same storage area in memory 11 following the reading of storage data SD from at least one storage area of memory 11. This gives rise to the advantage that storage data SD stored in, where applicable, weakly stored storage locations is re-stored or, where applicable, only amplified, further details of which are given with reference to an embodiment of the data carrier in accordance with FIG. 1.

In accordance with the embodiment, it is assumed that the user of data carrier 2 wishes to travel by subway and holds data carrier 2 in electromagnetic field HF of reader station 1 in order to pay the fare. Reader station 1 firstly identifies data carrier 2 and then transmits a debiting command as command data KD and the fare value as storage data SD to the data carrier. The transmitted storage data SD is hereby to be subtracted from the storage data SD, representing the credit value, stored in data storage area SD of memory 11.

Figure 2:
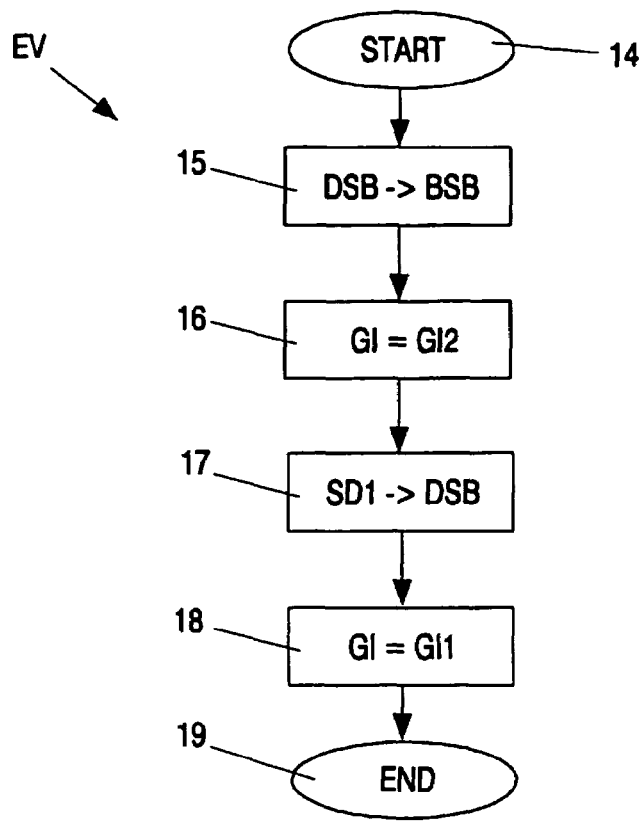
FIG. 2 shows a flowchart of a write method of a recovery method for writing storage data to a storage area of a memory of the data carrier in accordance with FIG. 1.
Figure 3:
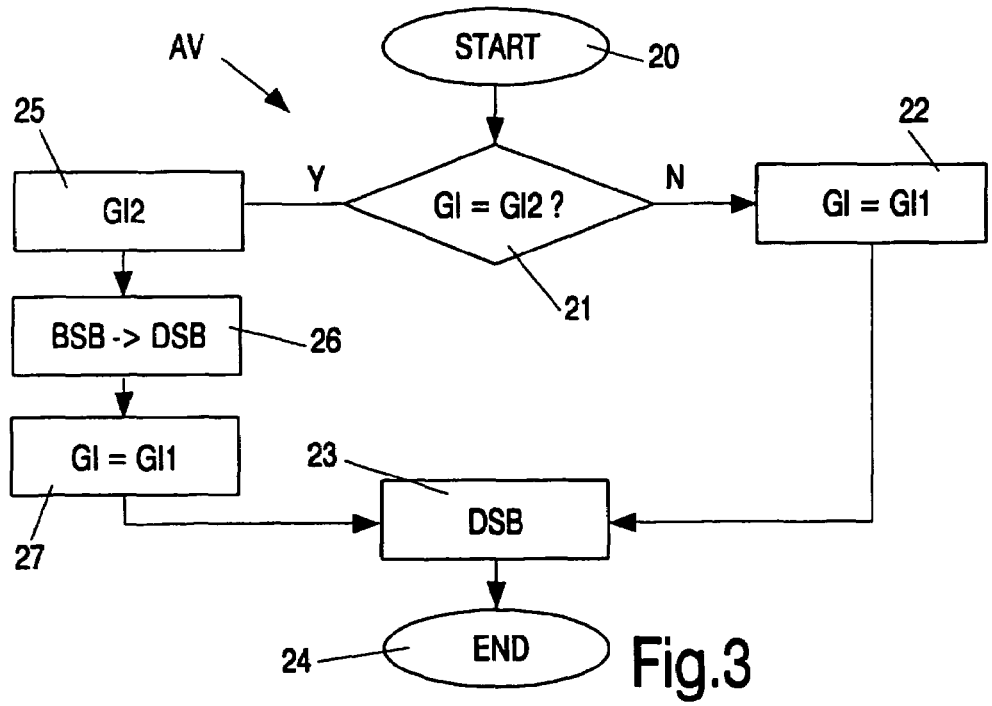
FIG. 3 shows a flowchart of a read method of the recovery method for reading storage data from a storage area of the memory of the data carrier in accordance with FIG. 1.

The command data KD and storage data SD received by antenna 7 and determined with transmitter/receiver stage 8 are processed by processing means 9. By virtue of the debiting command, processing means 9 causes readout means 12 to read the storage data SD stored in the data storage area, whereupon a read method AV shown in FIG. 3 is executed, which is described in greater detail below. Processing means 9 subtracts the fare value from the read-out storage data SD representing the credit value, and causes storage means 10 to store the now newly determined, lower credit value as new storage data SD in data storage area DSB of memory 11. A write method EV shown in FIG. 2 is executed for this purpose.

The execution of write method EV is started at a block 14, after which, at a block 15, the storage data SD stored in data storage area DSB is stored in backup storage area BSB, and therefore data storage area DSB is copied into backup storage area BSB. On successful conclusion of the storage of all storage data SD from data storage area DSB in backup storage area BSB, backup storage area BSB is identified at a block 16 as a storage area containing valid storage data SD. For this purpose, a second validity information GI2 is stored in validity storage area GSB, which second validity information GI2 is formed by bit sequence "111 0000".

At a block 17, the new storage data SD determined by processing means 9 is stored in data storage area DSB, wherein the storage data SD previously stored in data storage area DSB is over stored in data storage area DSB. Following the successful storing of the new storage data SD in data storage area DSB, a first validity information GII is stored in validity storage area GSB at a block 18. As a result, data storage area DSB is in turn identified as a storage area containing valid storage data SD. The first validity information GI1 is formed by bit sequence "0000 1111", which is complementary to the second validity information GI2. At a block 19, write method EV is terminated.

Write method EV forms part of a recovery method, which is executed by recovery means 13 and which ensures that, even if the storing of storage data SD is unexpectedly aborted, valid storage data SD can be read from memory 11. The validity information stored in validity storage area GSB indicates in each case whether valid storage data SD can be read from backup storage area BSB or from data storage area DSB. This is checked in each case by recovery means 13 before the reading of storage data SD during execution of read method AV in accordance with FIG. 3.

During execution of read method AV, a check is made at a block 21, following a block 20, as to whether the second validity information GI2 with bit sequence "1111 0000" is included in validity storage area GSB, and therefore backup storage area BSB is identified as a storage area containing valid storage data SD. If this bit sequence GI2 is not precisely stored in validity storage area GSB, valid storage data SD is stored in data storage area DSB, as will be described in greater detail below, for which reason the first validity information GI1 is stored in validity storage area GSB at a block 22.

This gives rise to the advantage that, if the first validity information GI1 has been stored only weakly in storage locations of validity storage area GSB, a reliably stored first validity information GI1 is stored in validity storage area GSB after block 22. Even in the event that validity storage area GSB is read multiple times, the first validity information GI1 will therefore always be reliably read, which is very advantageous.

Subsequently, at a block 23, in accordance with the first validity information GI1 now stored in validity storage area GSB, the storage data SD to be read in accordance with the read method AV is read from data storage area DSB and transmitted from readout means 12 to processing means 9. At a block 24, the read method AV is terminated.

If, on the other hand, it is established at block 21 that the bit sequence read from validity storage area GSB corresponds precisely to bit sequence "1111 0000" of the second validity information GI2, then, at a block 25, the storage locations of bit sequence "1111 0000" that contain bits "1" are re-written with the value "1". The floating gate of these storage locations is thereby charged to the storage charge corresponding to the value "1", wherein, unlike the case of storage of the value "1" in the storage location, a previous erasure or discharge procedure is dispensed with.

Dispensing with the previous erasure procedure gives rise to the advantage that, even if read method AV is aborted at precisely the instant at which the second validity information GI2 stored in validity storage area GSB is amplified, there is no risk that individual or, if applicable, all bits of the bit sequence "1111 0000" will be erased. It is thereby advantageously prevented that, as a result of a sudden abort of the amplification of the second validity information GI1, data storage area DSB, rather than backup storage area BSB, is identified as a storage area containing valid storage data SD.

At a block 26, the storage data SD of backup storage area BSB now identified as valid storage data SD is stored in data storage area DSB. Subsequently, at a block 27, data storage area DSB is in turn identified as a storage area containing valid storage data SD. At block 23, in accordance with the first validity information GI1 stored in validity storage area GSB, the storage data SD to be read is read from data storage area DSB and transmitted from readout means 12 to processing means 9. At block 24, the read method AV is terminated.

Below, it is assumed that, in accordance with the recovery method, read method AV is suddenly aborted at precisely the instant at which, at block 22, the first validity information GI1 is to be stored in validity storage area GSB. As explained above, this block 22 is always executed when it has been established at block 21 that a bit sequence other than bit sequence "1111 0000" of second validity information GI2 has been stored in validity storage area GSB. Even if the storage of first validity information GI1 is aborted at precisely the instant at which storage means 10 has undertaken the erasure procedure of all storage locations of validity storage area GSB, a move to block 22 will again take place at block 21 the next time read method AV is executed, since, in this case, bit sequence "0000 0000" would be stored in validity storage area GSB.

If read method AV is aborted at precisely the instant at which the bits "1" of the second validity information GI2 are amplified at block 25, read method AV would again move on to block 25 when it next executes block 21, for which reason no data loss of storage data SD can occur. This is because the bits "1" of the second validity information GI2 are only being amplified and not erased by means of a previous erasure procedure, for which reason the second validity information GI2 is stored in validity storage area GSB at all times.

If read method AV is aborted at precisely the instant at which storage data SD of backup storage area BSB is stored in data storage area DSB at block 26, read method AV would again move on to block 25 when it next executes block 21, since the second validity information GI2 is strongly stored. Whereupon, when block 26 is again executed, storage data SD of backup storage area BSB would be stored in full in data storage area DSB, for which reason no data loss of storage data SD can occur in this case either.

Once block 26 has been fully executed, the same storage data SD is stored in both data storage area DSB and backup storage area BSB, for which reason an abort at the instant of the execution of block 27 cannot lead to any data loss of storage data SD either.

It is thereby ensured, as a result of read method AV of the recovery method, that any storage locations that may be weakly stored in validity storage area GSB are strongly stored without as a result risking, in the case of a suddenly occurring abort, that the incorrect data storage area will be identified as the storage area SB containing valid storage data SD. Particularly advantageous here is the fact that—as already mentioned—storage locations containing bits "1" of validity storage area GSB containing second validity information GI2 are only amplified and not previously erased.

In accordance with the embodiment, only validity storage area GSB is read following an unexpected abort, and the read-out validity information GI is re-stored or amplified. Other storage areas could, of course, also be read and the read-out storage data SD re-stored or amplified in order to ensure, in these storage areas too, that no weakly stored storage locations are contained. It is, however, particularly advantageous to undertake this only for particularly sensitive storage areas, such as validity storage area GSB.

The principle in accordance with the invention, of reading storage data SD from a memory following an unexpected abort of the storing of storage data SD in the memory, and re-storing the read-out value in the same storage area of the memory may be advantageously applied in any kind of memory. It is hereby achieved that no weakly stored storage locations remain in the memory, which would lead to different storage data being read in the event of multiple reading of these storage locations, which is very disadvantageous.

A person skilled in the art is familiar with a multiplicity of memories, such as a hard disk, a capacity array, a diskette, a magnetic tape or magneto-optic storage media such as a DVD-RW.

In accordance with the embodiment, an amplification of the storage of storage charges corresponding to bits "1" in floating gates of MOS transistors has been described. In the case of inverse logic, the storage charge corresponding to a bit "0" can, of course, also be amplified in the floating gate.

It may be mentioned that a recovery device in accordance with the invention may be used in the most diverse areas. For instance, a recovery device of this kind could be used in a computer, a telephone or the electronics of an automobile.

It may be mentioned that storage locations of memories may also be formed by other than MOS transistors. For instance, a storage location of an electro-mechanical memory could be formed by a sliding switch which represents the bit "0" in one of its end positions, and the bit "1" in the other end position.

It may be mentioned that a computer or another CE appliance (e.g. DVD-RW appliance) may also form a recovery device.

It may be mentioned that the recovery device in accordance with the invention may be used for all critical data stored in a storage area of a memory. For instance, it could be used following an unexpected abort of the processing of a computer for directory data and pointer data of a directory of a hard disk. The unexpected abort would, in this case, be caused by a power failure, for example.

The invention claimed is:

1. A recovery device for recovering valid storage data in a memory, with:
   storage means for storing the storage data in storage areas of the memory;
   readout means for reading the stored storage data from the storage areas of the memory; and
   recovery means for detecting an unexpected abort during the storing of storage data and for recovering valid storage data in the memory, characterized in that the recovery means for recovering valid storage data are designed to re-store the read-out storage data in the same storage area in the memory following the reading of storage data from at least one storage area of the memory;
   characterized in that, before the storage of first storage data in a data storage area, the storage means is designed to store second storage data stored in the data storage area in a backup storage area, and that the storage means is designed to store validity information in a validity storage area of memory, wherein first validity information identifies the data storage area, and second validity information identifies the backup storage area as storage areas comprising valid storage data, and that recovery means is designed, before recovering valid storage data in data storage area, to read the validity information, stored in validity storage area, and subsequently to store the read-out validity information in the validity storage area.

2. A recovery means as claimed in claim 1 characterized in that the recovery means is designed to store the first validity information in validity storage area if neither the first nor the second validity information has been read from validity storage area.

3. A recovery means as claimed in claim 1, characterized in that the storage means is designed to store the first validity information, which is formed, at least at a first bit position, by the bit "1" and at least at a second bit position, by the bit "0", and to store the second validity information, which is formed, at least at the first bit position, by the bit "0" and at least at a second bit position, by the bit "1"

4. A recovery means as claimed in claim 3, characterized in that the recovery means is designed to establish whether the read-out validity information corresponds to the second validity information, and that, in order to store the read-out validity information, the recovery means overstores exclusively bit positions of stored validity information with bits "1" if the corresponding bit positions of the second validity information established comprise the bit "1", wherein a previous erasure procedure is dispensed with during the overstoring of these bit positions.

5. A data carrier for contactless communication with a reader station, with a memory for storing storage data and with communication means for receiving storage data to be stored in the memory and for transmitting storage data read from the memory,
   characterized in that a recovery device in accordance with claim 1 is provided.

6. A recovery method, for recovering valid storage data in a memory, wherein the following steps are followed:

storing of storage data in storage areas of the memory;
reading of the stored storage data from the storage areas, of the memory;
detection of an unexpected abort during the storing of storage data
recovery of valid storage data in the memory if an abort has been detected, characterized in that, in order to recover the valid storage data, the read-out storage data is re-stored in the same storage area in the memory following the reading of storage data from at least one storage area of the memory;
characterized in that, before the storing of the first storage data in a data storage area, second storage data stored in data storage area is stored in a backup storage area, and that validity information is stored in a validity storage area of memory, wherein first validity information identifies the data storage area, and second validity information identifies the backup storage area as storage areas comprising valid storage data, and that, before the recovery of valid storage data in data storage area, the validity information stored in validity storage area is read, and subsequently, the read-out validity information is stored in validity storage area.

7. A recovery method as claimed in claim 6, characterized in that, if neither the first nor the second validity information has been read from validity storage area, the first validity information is stored in validity storage area.

8. A recovery method, as claimed in claim 6, characterized in that the stored first validity information comprises the bit "1" at least at a first bit position, and the bit "0" at least at a second bit position, and that the stored second validity information comprises the bit "0" at least at the first bit position, and the bit "1" at least at the second bit position.

9. A recovery method, as claimed in claim 8, characterized in that it is established whether the read-out validity information corresponds to the second validity information, and that, in order to store the read-out validity information, exclusively bit positions of the stored validity information are over stored with bits "1" if the corresponding bit positions of the second validity information established comprise the bit"1", wherein, during the overstoring of these bit positions, a previous erasure procedure is dispensed with.

* * * * *